US012786339B2

United States Patent
(12) Chuto

(10) Patent No.: US 12,786,339 B2
(45) Date of Patent: Nov. 3, 2026

(54) IMAGE FORMING APPARATUS CAPABLE OF SENSING AMOUNT OF MISALIGNMENT BETWEEN POSITION OF IMAGE FORMING PORTION AND POSITION OF IMAGING PORTION, AND SENSING METHOD

(71) Applicant: KYOCERA Document Solutions Inc., Osaka (JP)

(72) Inventor: Tatsuya Chuto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 156 days.

(21) Appl. No.: 19/035,522

(22) Filed: Jan. 23, 2025

(65) Prior Publication Data

US 2025/0247483 A1 Jul. 31, 2025

(30) Foreign Application Priority Data

Jan. 26, 2024 (JP) ................................ 2024-009861

(51) Int. Cl.
*G06K 5/04* (2006.01)
*H04N 1/387* (2006.01)

(52) U.S. Cl.
CPC ................................ *H04N 1/3872* (2013.01)

(58) Field of Classification Search
CPC ................................ H04N 1/3872; G06K 5/04
See application file for complete search history.

(56) References Cited

U.S. PATENT DOCUMENTS 10,284,747 B2 * 5/2019 Sakata ................ H04N 1/3873
10,397,440 B2 * 8/2019 Kurokawa ........... G06K 15/027

FOREIGN PATENT DOCUMENTS

JP 2021148849 A 9/2021

* cited by examiner

*Primary Examiner* — King Y Poon
(74) *Attorney, Agent, or Firm* — Alleman Hall LLP

(57) ABSTRACT

An image forming apparatus acquires shape data indicating a shape of a sensing sheet conveyed along a conveyance route, adjusts a position of a first image in first image data including the first image on the basis of a positional relationship between a sheet region in the acquired shape data and a first reference position in the shape data, forms an image based on the adjusted first image data on the sensing sheet, and senses an amount of positional misalignment of an imaging portion to be used to acquire the shape data by using the sensing sheet on which the image has been formed.

4 Claims, 9 Drawing Sheets

IMAGE FORMING APPARATUS CAPABLE OF SENSING AMOUNT OF MISALIGNMENT BETWEEN POSITION OF IMAGE FORMING PORTION AND POSITION OF IMAGING PORTION, AND SENSING METHOD

INCORPORATION BY REFERENCE

This application is based upon and claims the benefit of priority from the corresponding Japanese Patent Application No. 2024-009861 filed on Jan. 26, 2024, the entire contents of which are incorporated herein by reference.

BACKGROUND

This disclosure relates to an image forming apparatus and a sensing method.

An image forming apparatus including an imaging portion such as a line sensor that images a sheet conveyed through the position of image formation by an image forming portion has been known. In addition, the image forming apparatus that adjusts the position of an image to be formed on the sheet in the width direction of the sheet orthogonal to the conveyance direction of the sheet on the basis of a result of imaging by the imaging portion has been known.

SUMMARY

An image forming apparatus according to an aspect of this disclosure includes an image forming portion, an output portion, a first conveyance processing portion, a first acquisition processing portion, a first adjustment processing portion, a formation processing portion, a second conveyance processing portion, a second acquisition processing portion, a second adjustment processing portion, a mask processing portion, and a sensing processing portion. The image forming portion forms an image on a sheet conveyed along a conveyance route defined in advance. The output portion includes an imaging portion on an upstream side of the image forming portion in the conveyance route in a conveyance direction of the sheet. The imaging portion is provided to be long along a width direction orthogonal to the conveyance direction. The output portion outputs shape data indicating a shape of the sheet imaged by the imaging portion. The first conveyance processing portion conveys a sensing sheet along the conveyance route. The first acquisition processing portion acquires the shape data by using the output portion. The shape data indicates the shape of the sensing sheet conveyed by the first conveyance processing portion. The first adjustment processing portion adjusts a position of a first image defined in advance in first image data in a specific direction corresponding to the width direction on the basis of a positional relationship in the specific direction between a sheet region in the shape data acquired by the first acquisition processing portion and a first reference position defined in advance in the shape data. The first image data includes the first image. The formation processing portion forms an image on the sensing sheet by using the image forming portion. The image is based on the first image data adjusted by the first adjustment processing portion. The second conveyance processing portion conveys, along the conveyance route, the sensing sheet on which an image has been formed by the formation processing portion. The second acquisition processing portion acquires the shape data by using the output portion. The shape data indicates a shape of the sensing sheet conveyed by the second conveyance processing portion. The second adjustment processing portion adjusts a position of a second image in second image data in the specific direction on the basis of a positional relationship in the specific direction between a sheet region in the shape data acquired by the second acquisition processing portion and the first reference position. The second image has a larger size in the specific direction than a size of the first image. The second image data includes the second image. The mask processing portion masks outside of a region of the second image data overlapping with the sheet region of the shape data in a case where the shape data is overlaid on the second image data such that a second reference position defined in advance in the second image data and the first reference position in the shape data agree with each other. The second image data is adjusted by the second adjustment processing portion. The shape data is acquired by the second acquisition processing portion. The sensing processing portion senses an amount of misalignment of the imaging portion in the width direction with respect to the image forming portion on the basis of a positional relationship in the specific direction between the second image in the second image data and a mask region masked by the mask processing portion. The mask region is included in the second image.

A sensing method according to another aspect of this disclosure is executed by an image forming apparatus including an image forming portion configured to form an image on a sheet conveyed along a conveyance route defined in advance and an output portion including an imaging portion on an upstream side of the image forming portion in the conveyance route in a conveyance direction of the sheet, the imaging portion being provided to be long along a width direction orthogonal to the conveyance direction, the output portion being configured to output shape data indicating a shape of the sheet imaged by the imaging portion. The sensing method include a first conveyance step, a first acquisition step, a first adjustment step, a formation step, a second conveyance step, a second acquisition step, a second adjustment step, a mask step, and a sensing step. In the first conveyance step, a sensing sheet is conveyed along the conveyance route. In the first acquisition step, the shape data is acquired by using the output portion. The shape data indicates the shape of the sensing sheet conveyed in the first conveyance step. In the first adjustment step, a position of a first image defined in advance in first image data in a specific direction corresponding to the width direction is adjusted on the basis of a positional relationship in the specific direction between a sheet region in the shape data acquired in the first acquisition step and a first reference position defined in advance in the shape data. The first image data includes the first image. In the formation step, an image is formed on the sensing sheet by using the image forming portion. The image is based on the first image data adjusted in the first adjustment step. In the second conveyance step, the sensing sheet on which an image has been formed in the formation step is conveyed along the conveyance route. In the second acquisition step, the shape data is acquired by using the output portion. The shape data indicates a shape of the sensing sheet conveyed in the second conveyance step. In the second adjustment step, a position of a second image in second image data in the specific direction is adjusted on the basis of a positional relationship in the specific direction between a sheet region in the shape data acquired in the second acquisition step and the first reference position. The second image has a larger size in the specific direction than a size of the first image. The second image data includes the second image. In the mask step, outside of a region of the second image data overlapping with the sheet region of the shape data in a case where the shape data is overlaid on the second image data such that a second reference position defined in advance in the second image data and the first reference position in the shape data agree with each other is masked. The second image data is adjusted in the second adjustment step. The shape data is acquired in the second acquisition step. In the sensing step, an amount of misalignment of the imaging portion in the width direction with respect to the image forming portion is sensed on the basis of a positional relationship in the specific direction between the second image in the second image data and a mask region masked in the mask step. The mask region is included in the second image.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of this disclosure will be described with reference to the appended drawings. It is to be noted that the following embodiment is a specific example of this disclosure and does not limit the technical scope of this disclosure.

[Configuration of Image Forming Apparatus 100]

First, the configuration of an image forming apparatus 100 according to an embodiment of this disclosure will be described with reference to FIGS. 1 to 3. It is to be noted that FIG. 1 shows a sheet conveyance route R11 by a two-dot chain line.

The image forming apparatus 100 is a printer capable of forming an image on a sheet in an ink-jet method. It is to be noted that this disclosure may be applied to a facsimile apparatus, a copier, or a multifunction peripheral capable of forming an image on a sheet in an ink-jet method. In addition, this disclosure may be applied to an image forming apparatus capable of forming an image on a sheet in a method different from the ink-jet method such as electrophotography.

Figure 1:
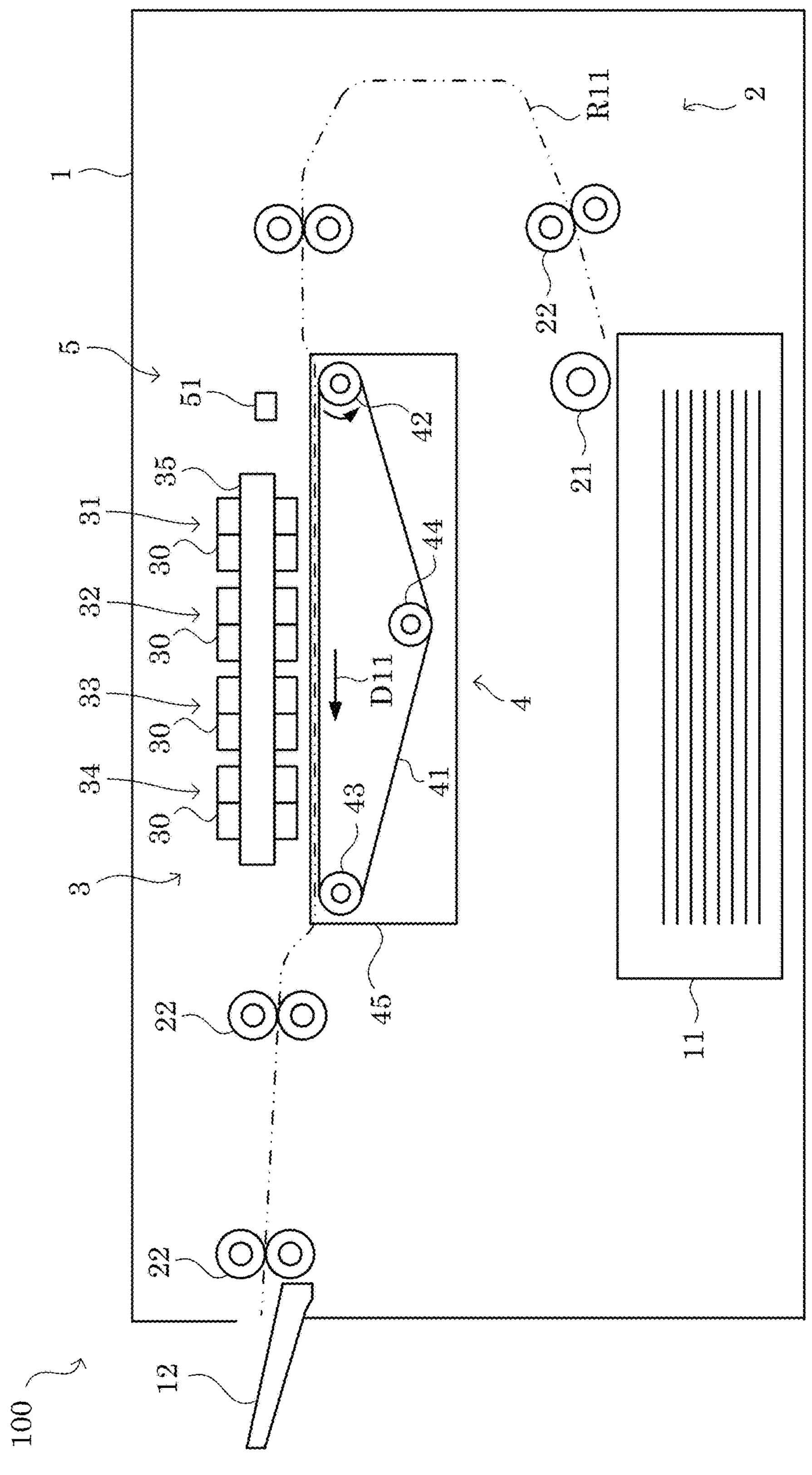
FIG. 1 is a cross-sectional view of a configuration of an image forming apparatus according to an embodiment of this disclosure.

As shown in FIG. 1, the image forming apparatus 100 includes a housing 1, a sheet conveying portion 2, an image forming portion 3, a conveying unit 4, and a shape reading portion 5. In addition, the image forming apparatus 100 includes an operation display portion 6, a control portion 7, and an image processing portion 8 shown in FIG. 3.

The housing 1 houses the respective components of the image forming apparatus 100. The housing 1 is detachably provided with a sheet feed cassette 11 (see FIG. 1). The sheet feed cassette 11 stores a sheet on which an image is formed. The outside surface of the housing 1 is provided with a sheet discharge tray 12 (see FIG. 1). A sheet on which an image is formed by the image forming portion 3 is discharged to the sheet discharge tray 12. A sheet stored in the sheet feed cassette 11 is conveyed inside the housing 1 along the sheet conveyance route R11 (see FIG. 1) that reaches the sheet discharge tray 12 through the position of image formation by the image forming portion 3.

The sheet conveying portion 2 conveys a sheet stored in the sheet feed cassette 11 along the sheet conveyance route R11 (see FIG. 1). As shown in FIG. 1, the sheet conveying portion 2 includes a pickup roller 21 and a plurality of conveying rollers 22. The pickup roller 21 picks up the uppermost sheet of a bundle of sheets stored in the sheet feed cassette 11 and sends the sheet to the sheet conveyance route R11. The plurality of conveying rollers 22 is provided side by side along the sheet conveyance route R11. Each of the conveying rollers 22 conveys a sheet along the sheet conveyance route R11. Each of the conveying rollers 22 conveys a sheet in a conveyance direction D11 (see FIG. 1) from the sheet feed cassette 11 to the sheet discharge tray 12.

The image forming portion 3 forms an image on a sheet conveyed along the sheet conveyance route R11 (see FIG. 1) (an example of a conveyance route according to this disclosure). As shown in FIG. 1, the image forming portion 3 includes line heads 31 to 34 and a head frame 35.

Figure 2:
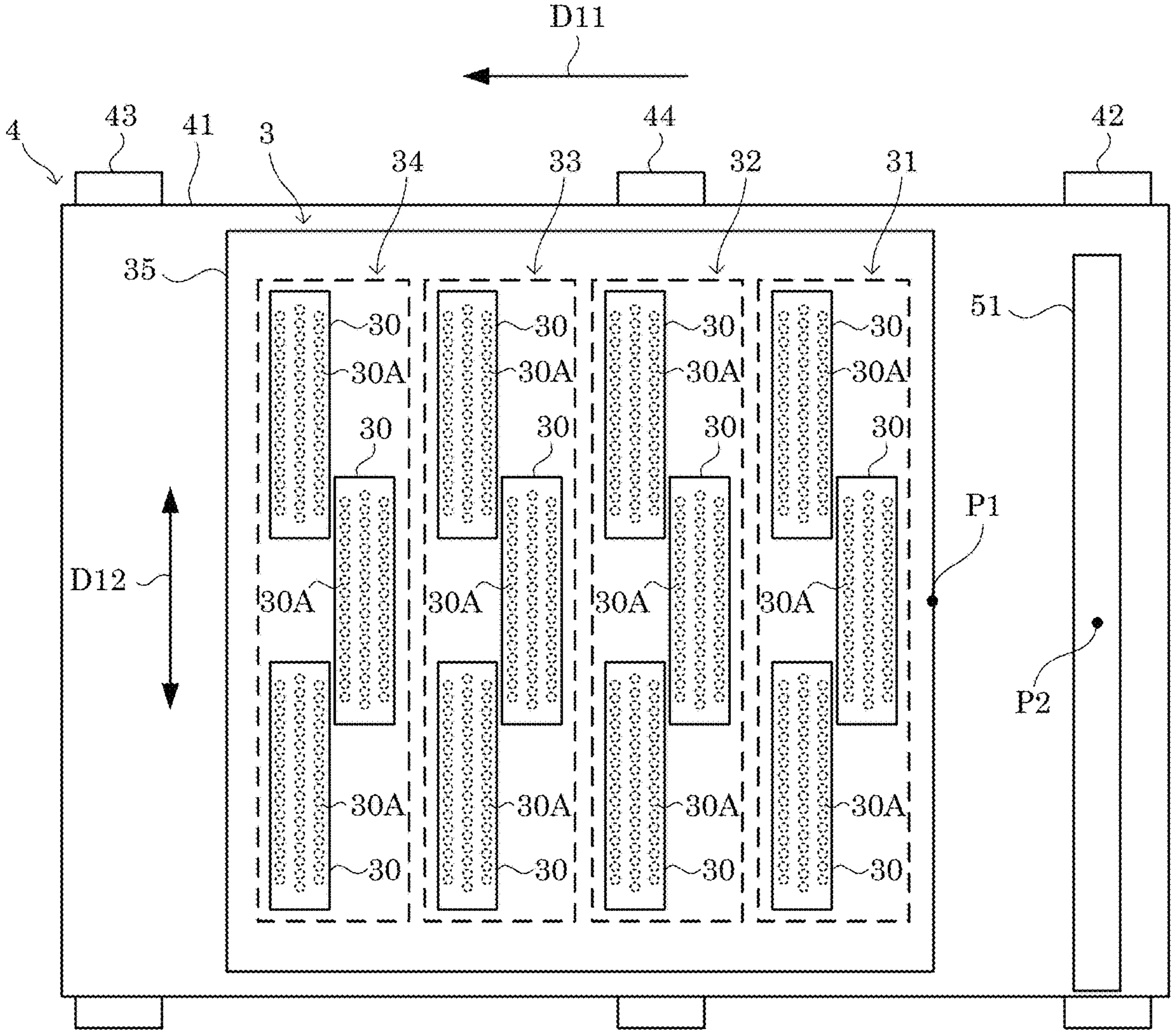
FIG. 2 is a plan view of configurations of an image forming portion, a conveying unit, and a line sensor in the image forming apparatus according to the embodiment of this disclosure.

As shown in FIG. 2, each of the line heads 31 to 34 is long in a width direction D12 orthogonal to the conveyance direction D11. Specifically, each of the line heads 31 to 34 has the length corresponding to the width of a sheet having the maximum size in the width direction D12 among sheets storable in the sheet feed cassette 11. The respective line heads 31 to 34 are provided side by side at even intervals along the conveyance direction D11.

As shown in FIG. 2, each of the line heads 31 to 34 includes a plurality of recording heads 30. Each of the recording head 30 jets ink to a sheet conveyed by the conveying unit 4. Each of the recording heads 30 provided to the line head 31 jets black ink. Each of the recording heads 30 provided to the line head 32 jets cyan ink. Each of the recording heads 30 provided to the line head 33 jets magenta ink. Each of the recording heads 30 provided to the line head 34 jets yellow ink.

Each of the recording heads 30 includes a plurality of nozzles 30A (see FIG. 2) that each jets ink. The plurality of nozzles 30A is provided on the surface of the recording head 30 opposed to a sheet conveyed by the conveying unit 4.

In addition, each of the recording heads 30 includes a pressurizing chamber (not shown), a piezoelectric element (not shown), and an individual channel (not shown) corresponding to each of the nozzles 30A. The pressurizing chamber communicates with the nozzle 30A and stores ink. The piezoelectric element causes the nozzle 30A to jet ink in response to the application of a drive voltage defined in advance. The individual channel is an ink channel provided between the pressurizing chamber and a common channel (not shown) common to the plurality of nozzles 30A. A plurality of the individual channels corresponding to the plurality of nozzles 30A is connected to the common channel. The common channel is connected to an ink supply portion (not shown) that supplies ink to each of the pressurizing chambers.

As shown in FIG. 2, the line head 31 includes the three recording heads 30 having a staggered array along the width direction D12. In addition, each of the other line heads 32 to 34 also includes the three recording heads 30 having a staggered array along the width direction D12 as with the line head 31.

The head frame 35 supports the line heads 31 to 34. The head frame 35 is supported by the housing 1. It is to be noted that the number of line heads provided to the image forming portion 3 does not have to be 4. In addition, the number of recording heads 30 provided to each of the line heads 31 to 34 does not have to be 3.

The image forming portion 3 forms, on a sheet, an image based on image data received from the image processing portion 8. Specifically, the image forming portion 3 controls ink jetting by each of the line heads 31 to 34 on the basis of image data received from the image processing portion 8.

As shown in FIG. 1, the conveying unit 4 is disposed below the line heads 31 to 34. The conveying unit 4 conveys a sheet while opposing the sheet to the recording heads 30. For example, whenever the recording heads 30 each jet ink, the conveying unit 4 conveys a sheet by the amount of conveyance defined in advance. In addition, the conveying unit 4 stops conveying a sheet while the recording heads 30 are each jetting ink. As shown in FIG. 1, the conveying unit 4 includes a conveying belt 41 on which a sheet is placed, a first stretching roller 42, a second stretching roller 43, a third stretching roller 44, and a conveyance frame 45. The first stretching roller 42, the second stretching roller 43, and the third stretching roller 44 stretch the conveying belt 41. The conveyance frame 45 supports them. It is to be noted that the gap between the conveying belt 41 and the recording heads 30 is adjusted to cause the gap between the surface of a sheet and the recording heads 30 to have a predetermined distance (e.g., 1 mm) at the time of image formation.

The first stretching roller 42 is driven to rotate by rotational driving force supplied from an unillustrated motor. This rotates the conveying belt 41 in the direction that allows a sheet to be conveyed in the conveyance direction D11 (see FIG. 1). It is to be noted that the conveying unit 4 is provided with a suction unit (not shown) or the like to cause the conveying belt 41 to adsorb a sheet. The suction unit takes in air from a large number of through holes formed in the conveying belt 41.

The shape reading portion 5 reads the shape of a sheet conveyed along the sheet conveyance route R11.

Figure 3:
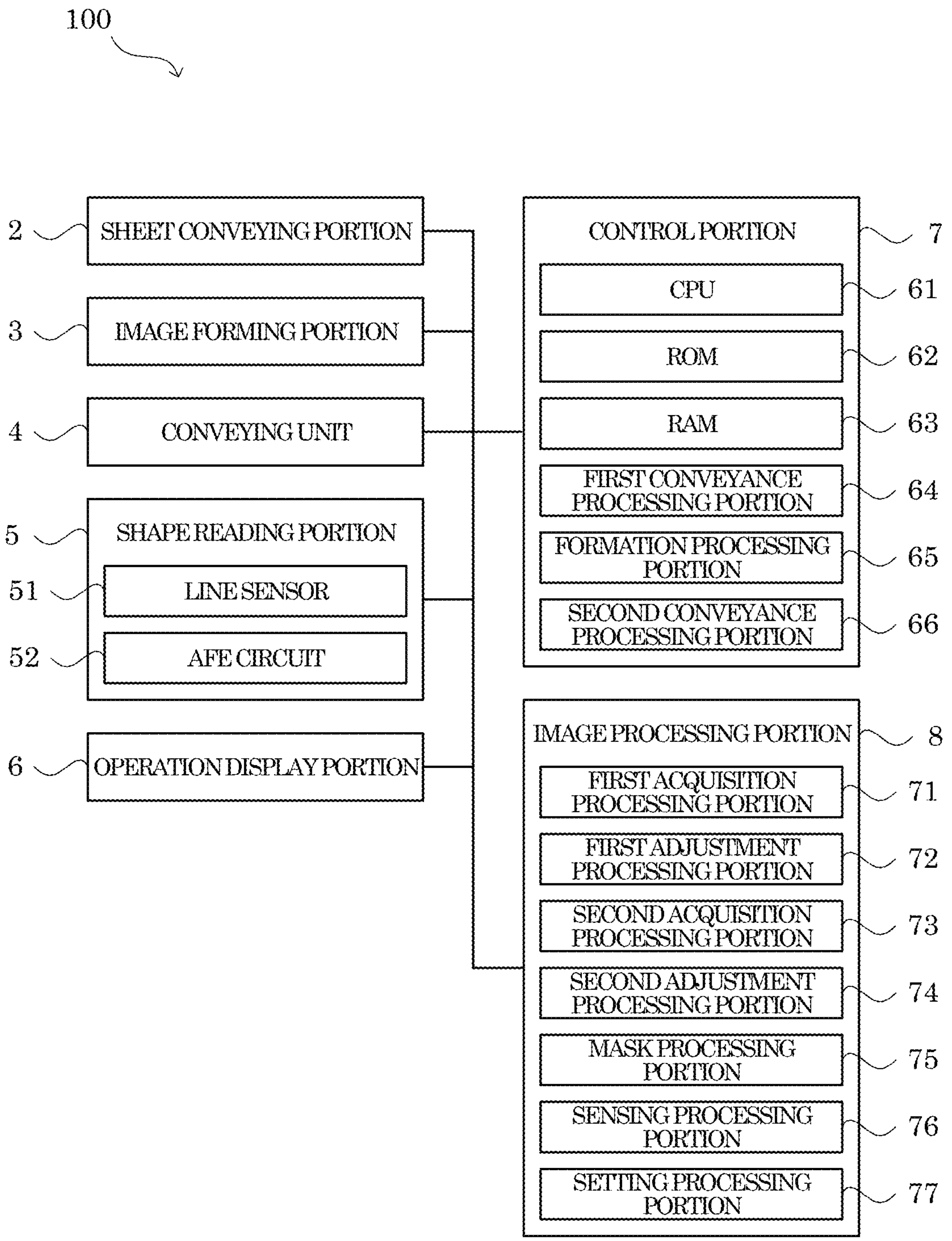
FIG. 3 is a block diagram showing a system configuration of the image forming apparatus according to the embodiment of this disclosure.

As shown in FIG. 3, the shape reading portion 5 includes a line sensor 51 and an analog front-end (AFE) circuit 52.

As shown in FIG. 1, the line sensor 51 is provided on the upstream side of the image forming portion 3 in the sheet conveyance route R11 in the conveyance direction D11 of a sheet. In addition, the line sensor 51 is provided above the conveying belt 41. In addition, as shown in FIG. 2, the line sensor 51 is provided to be long along the width direction D12 orthogonal to the conveyance direction D11. The line sensor 51 images a sheet conveyed along the sheet conveyance route R11. The line sensor 51 is an example of an imaging portion according to this disclosure.

For example, the line sensor 51 is a contact image sensor (CIS). The line sensor 51 includes a plurality of imaging elements disposed side by side in the width direction D12 (see FIG. 2). Each of the imaging elements includes a light emitting portion and a light receiving portion. The light emitting portion emits light to the conveying belt 41. The light receiving portion is provided such that the light receiving portion is allowed to receive light emitted from the light emitting portion and reflected by the conveying belt 41 or a conveyed sheet. The light receiving portion outputs an analog electrical signal corresponding to the amount of received light. The line sensor 51 images a sheet conveyed along the sheet conveyance route R11 in an imaging cycle defined in advance. Specifically, the line sensor 51 outputs an analog electrical signal corresponding to an image of an imaging target (the sheet and the conveying belt 41) opposed to the line sensor 51 in the imaging cycle. It is to be noted that the outer peripheral surface of the conveying belt 41 is colored to have a color like black that reduces the reflection of light emitted from the light emitting portion more than the base color (white) of the sheet does.

The AFE circuit 52 is an electronic circuit that executes a process defined in advance on an analog electrical signal output from the line sensor 51. Specifically, the AFE circuit 52 includes a signal converting portion that converts an analog electrical signal output from the line sensor 51 into a digital electrical signal (image data). In addition, the AFE circuit 52 includes a binarize portion that executes a binarize process on image data output from the signal converting portion. The binarize process is a process of binarizing each of the pixels included in image data output from the signal converting portion as a value indicating the presence or absence of a sheet. The image data (referred to as "line data" below) binarized by the binarize portion is input to the image processing portion 8.

The shape reading portion 5 outputs shape data X10 (see FIG. 5) indicating the shape of a sheet imaged by the line sensor 51. The shape data X10 is data including a plurality of pieces of the line data output from the AFE circuit 52 in a period in which the shape reading portion 5 is reading the shape of a sheet. The shape reading portion 5 is an example of an output portion according to this disclosure.

The operation display portion 6 is a user interface of the image forming apparatus 100. The operation display portion 6 includes a display portion and an operation portion. The display portion displays various kinds of information in response to a control instruction from the control portion 7. For example, the display portion is a flat-panel display such as a liquid-crystal display. The operation portion inputs various kinds of information to the control portion 7 in response to an operation of a user. For example, the operation portion includes an operation key and a touch panel.

The control portion 7 integrally controls the image forming apparatus 100. As shown in FIG. 3, the control portion 7 includes a CPU 61, a ROM 62, and a RAM 63. The CPU 61 is a processor that executes various calculation processes. The ROM 62 is a non-volatile storage device in which information such as a control program or the like for causing the CPU 61 to execute various processes is stored in advance. The RAM 63 is a volatile or non-volatile storage device that is used as a temporary storage memory (work area) for various processes which are executed by the CPU 61. The CPU 61 integrally controls the image forming apparatus 100 by executing various control programs stored in the ROM 62 in advance.

The image processing portion 8 adjusts image data input to the image forming portion 3, that is, image data to be used to form an image on a sheet, on the basis of image data received from the shape reading portion 5. For example, the image processing portion 8 adjusts the position of a print target image in a second direction D22 in image data input to the image forming portion 3 on the basis of image data received from the shape reading portion 5. The second direction D22 is a direction corresponding to the width direction D12. Even in a case where a sheet conveyed along the sheet conveyance route R11 has a positional misalignment in the width direction D12, it is therefore possible to form a print target image in the middle of the sheet in the width direction D12. In addition, the image processing portion 8 masks part of image data input to the image forming portion 3, the part to be used to form an image on the outside of a sheet conveyed along the sheet conveyance route R11, on the basis of image data received from the shape reading portion 5. This prevents ink from being jetted to the outside of the sheet. The image processing portion 8 includes an electronic circuit such as an integrated circuit (an ASIC or a DSP).

Incidentally, an image forming apparatus that adjusts the position of an image to be formed on a sheet in the width direction D12 on the basis of a result of imaging by the line sensor 51 has been known.

Here, in the image forming apparatus described above, a position P1 (see FIG. 2) of the middle of the image forming portion 3 in the width direction D12 and a position P2 (see FIG. 2) of the middle of the line sensor 51 in the width direction D12 do not agree with each other in some cases. That is, the line sensor 51 is misaligned in the width direction D12 with respect to the image forming portion 3 in some cases. In this case, even an adjustment of the position of an image to be formed on a sheet made on the basis of a result of imaging by the line sensor 51 does not allow the image to be formed in the middle of the sheet in the width direction D12.

In contrast, the image forming apparatus 100 according to the embodiment of this disclosure is capable of sensing the amount of misalignment between the position P1 of the image forming portion 3 and the position P2 of the line sensor 51 as described below.

As shown in FIG. 3, the control portion 7 includes a first conveyance processing portion 64, a formation processing portion 65, and a second conveyance processing portion 66. Specifically, the CPU 61 of the control portion 7 executes the control programs stored in the ROM 62 to function as the first conveyance processing portion 64, the formation processing portion 65, and the second conveyance processing portion 66. It is to be noted that the first conveyance processing portion 64, the formation processing portion 65, and the second conveyance processing portion 66 may be achieved by an electronic circuit.

In addition, as shown in FIG. 3, the image processing portion 8 includes a first acquisition processing portion 71, a first adjustment processing portion 72, a second acquisition processing portion 73, a second adjustment processing portion 74, a mask processing portion 75, a sensing processing portion 76, and a setting processing portion 77. It is to be noted that the CPU 61 of the control portion 7 may function as the respective processing portions by executing the control programs stored in the ROM 62.

The first conveyance processing portion 64 executes a first conveyance process of conveying a sensing sheet SH11 (see FIG. 8) along the sheet conveyance route R11. For example, the sensing sheet SH11 is a blank sheet of A4 portrait size. It is to be noted that the sensing sheet SH11 may be a sheet of any size.

For example, the first conveyance processing portion 64 causes the operation display portion 6 to display a first guidance screen in response to an operation of a user defined in advance on the operation display portion 6. The first guidance screen includes a message asking the user to place the sensing sheet SH11 on the sheet feed cassette 11. In addition, the first guidance screen includes a first enter key to be used to perform an operation of executing the first conveyance process.

The first conveyance processing portion 64 then executes the first conveyance process in a case where an operation of the user on the first enter key is received. In the first conveyance process, the sheet conveying portion 2 and the conveying unit 4 are used to convey the sensing sheet SH11 placed on the sheet feed cassette 11 along the sheet conveyance route R11.

The first acquisition processing portion 71 executes a first acquisition process of acquiring shape data X11 (see FIG. 5) by using the shape reading portion 5. The shape data X11 is the shape data X10 (see FIG. 5) indicating the shape of the sensing sheet SH11 conveyed by the first conveyance processing portion 64.

For example, in a case where the front end of the sensing sheet SH11 is sensed by an unillustrated sheet sensor provided on the upstream side of the line sensor 51 in the sheet conveyance route R11 (see FIG. 1) in the conveyance direction D11, the first acquisition processing portion 71 causes the shape reading portion 5 to start to read the shape of the sensing sheet SH11. This outputs the line data from the AFE circuit 52 in the imaging cycle. In addition, in a case where a specific time defined in advance passes after the back end of the sensing sheet SH11 is sensed by the sheet sensor, the first acquisition processing portion 71 causes the shape reading portion 5 to end reading the shape of the sensing sheet SH11. The specific time is set such that the shape reading portion 5 ends reading the shape of the sensing sheet SH11 after the back end of the sensing sheet SH11 passes through the position opposed to the line sensor 51. The first acquisition processing portion 71 then acquires each piece of the line data output from the AFE circuit 52 in a period in which the shape reading portion 5 is reading the shape of the sensing sheet SH11.

Figure 5:
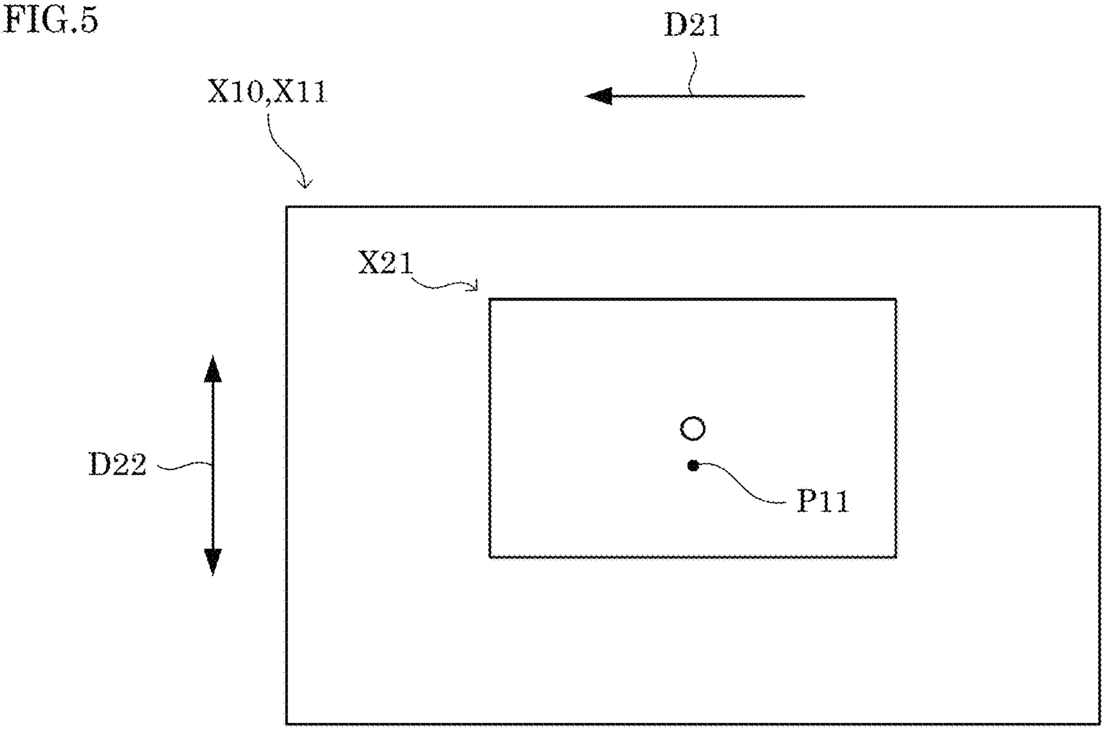
FIG. 5 is a diagram showing an example of shape data acquired by a first acquisition processing portion of the image forming apparatus according to the embodiment of this disclosure.

FIG. 5 shows an example of the shape data X11. The shape data X11 shown in FIG. 5 is data acquired by the first acquisition processing portion 71 in a case where the position P1 (see FIG. 2) of the image forming portion 3 and the position P2 (see FIG. 2) of the line sensor 51 do not agree with each other and the sensing sheet SH11 has no positional misalignment in the width direction D12. It is to be noted that the image forming portion 3 is disposed in the middle of the sheet conveyance route R11 in the width direction D12. The shape data X11 includes a sheet region X21 indicating the sensing sheet SH11. The sheet region X21 is a region formed by using a pixel indicating the presence of a sheet. The outside of the sheet region X21 in the shape data X11 is formed by using a pixel indicating the absence of a sheet. It is to be noted that a first direction D21 shown in FIG. 5 is a direction corresponding to the conveyance direction D11.

In a case where the position P1 (see FIG. 2) of the image forming portion 3 and the position P2 (see FIG. 2) of the line sensor 51 do not agree with each other, the sheet region X21 is disposed at a position shifted in the second direction D22 from a first reference position P11 (see FIG. 5) defined in advance in the shape data X10 as shown in FIG. 5. It is to be noted that FIG. 5 shows the middle portion of the sheet region X21 by a white circle. The first reference position P11 is a position corresponding to the position P2 of the line sensor 51. Specifically, the first reference position P11 is the position of the middle of the shape data X10 in the first direction D21 and the position of the middle of the shape data X10 in the second direction D22.

The first adjustment processing portion 72 executes a first adjustment process of adjusting the position of a first image Y21 defined in advance in first image data Y11 (see FIG. 6) in the second direction D22 on the basis of the positional relationship in the second direction D22 (an example of a specific direction according to this disclosure) corresponding to the width direction D12 between the sheet region X21 (see FIG. 5) in the shape data X11 acquired by the first acquisition processing portion 71 and the first reference position P11 (see FIG. 5) in the shape data X10. The first image data Y11 includes the first image Y21.

Here, the first image data Y11 is image data in the bitmap format that includes a plurality of pixel columns along the second direction D22. The length (the number of pixels) of each of the pixel columns corresponds to the image formation area of the image forming portion 3 in the width direction D12. That is, the middle of each of the pixel columns corresponds to the position P1 (see FIG. 2) of the middle of the image forming portion 3 in the width direction D12.

Specifically, the first adjustment processing portion 72 acquires the amount of misalignment and the direction of misalignment of the sheet region X21 along the second direction D22 with respect to the first reference position P11 on the basis of coordinate information about the middle portion of the sheet region X21 in the shape data X11 acquired by the first acquisition processing portion 71 and coordinate information about the first reference position P11. The first adjustment processing portion 72 then moves the first image Y21 in the acquired direction of misalignment by the acquired amount of misalignment.

Figure 6:
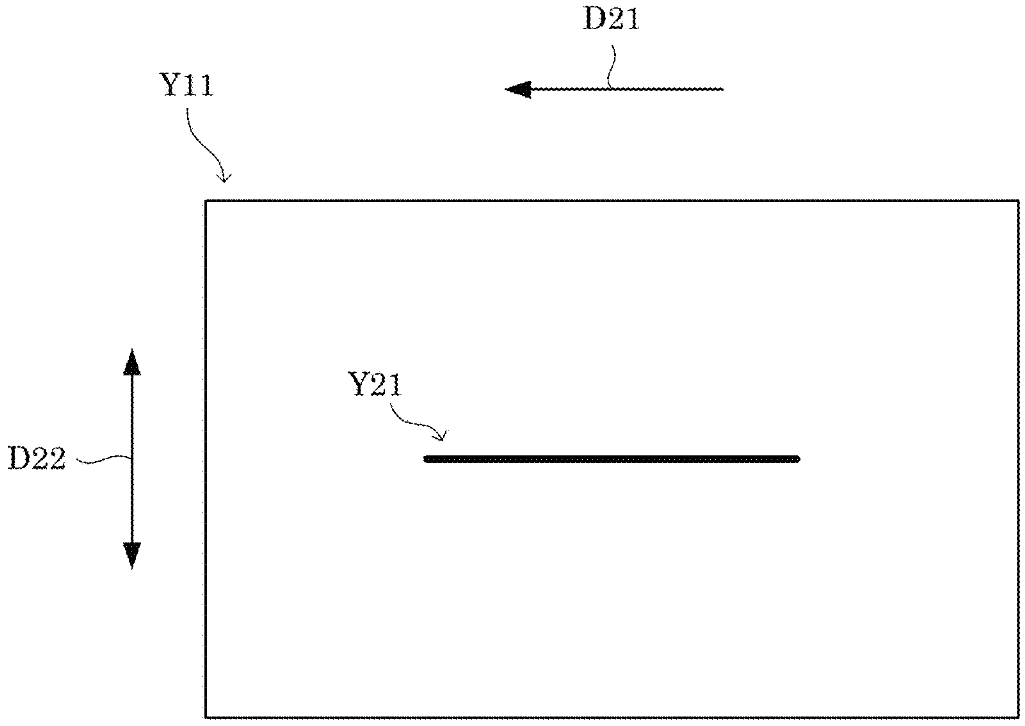
FIG. 6 is a diagram showing an example of first image data that has not yet been adjusted by a first adjustment processing portion of the image forming apparatus according to the embodiment of this disclosure.

FIG. 6 shows an example of the first image data Y11 that has not yet been adjusted by the first adjustment processing portion 72. For example, the first image Y21 is a linear or striped image that is long in the first direction D21 as shown in FIG. 6. For example, the first image Y21 is an image colored in black. The first image Y21 is disposed in the middle of the first image data Y11 in the second direction D22. The outside of the first image Y21 in the first image data Y11 is a colorless region. That is, the outside of the first image Y21 in the first image data Y11 is formed by using a white pixel.

Figure 7:
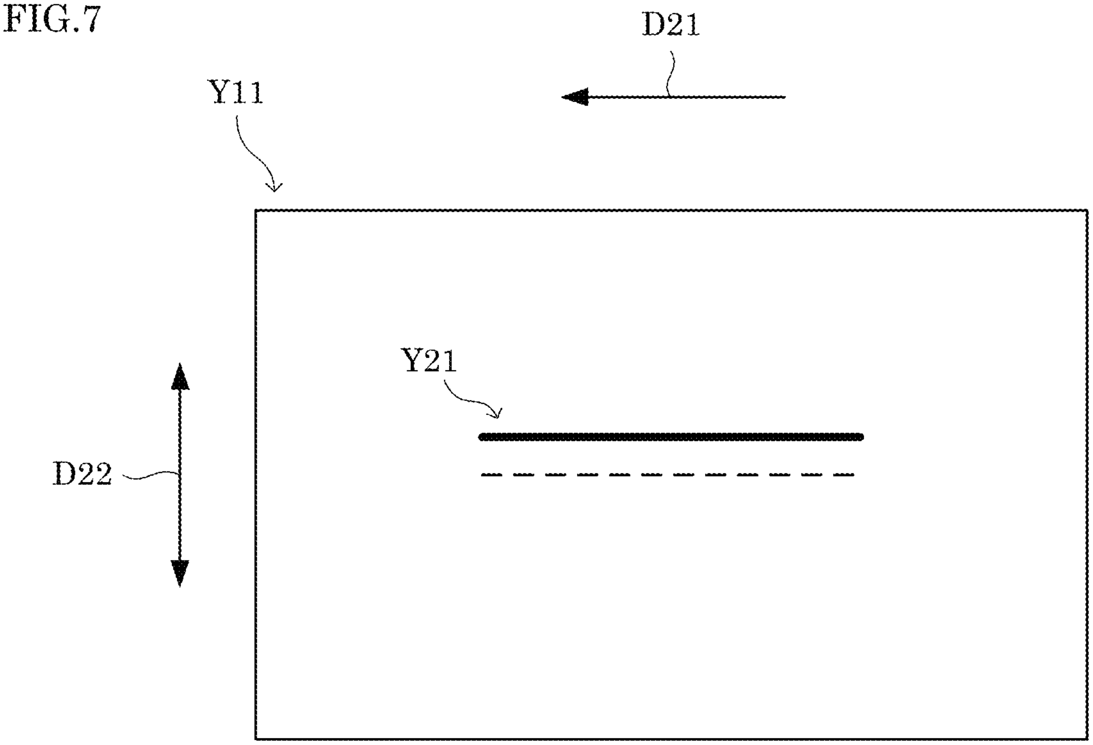
FIG. 7 is a diagram showing an example of the first image data adjusted by the first adjustment processing portion of the image forming apparatus according to the embodiment of this disclosure.

In addition, FIG. 7 shows an example of the first image data Y11 adjusted by the first adjustment processing portion 72. It is to be noted that FIG. 7 shows the first image Y21 that has not yet been adjusted (moved) by the first adjustment processing portion 72 by a dashed line.

The formation processing portion 65 executes a formation process of forming, on the sensing sheet SH11, an image based on the first image data Y11 (see FIG. 7) adjusted by the first adjustment processing portion 72 by using the image forming portion 3.

For example, the formation processing portion 65 inputs, to the image forming portion 3, a plurality of pixel columns along the second direction D22 included in the first image data Y11 adjusted by the first adjustment processing portion 72 in order along the first direction D21 from the most downstream pixel column in the first direction D21. In addition, the formation processing portion 65 starts to input the respective pixel columns to the image forming portion 3 at input timings defined in advance. The input timings are set such that the whole of the first image Y21 is formed on the sensing sheet SH11. Whenever the pixel column is input, ink jetting by the line head 31 is thus controlled in the image forming portion 3 on the basis of the input pixel column and the first image Y21 is formed on the sensing sheet SH11.

Figure 8:
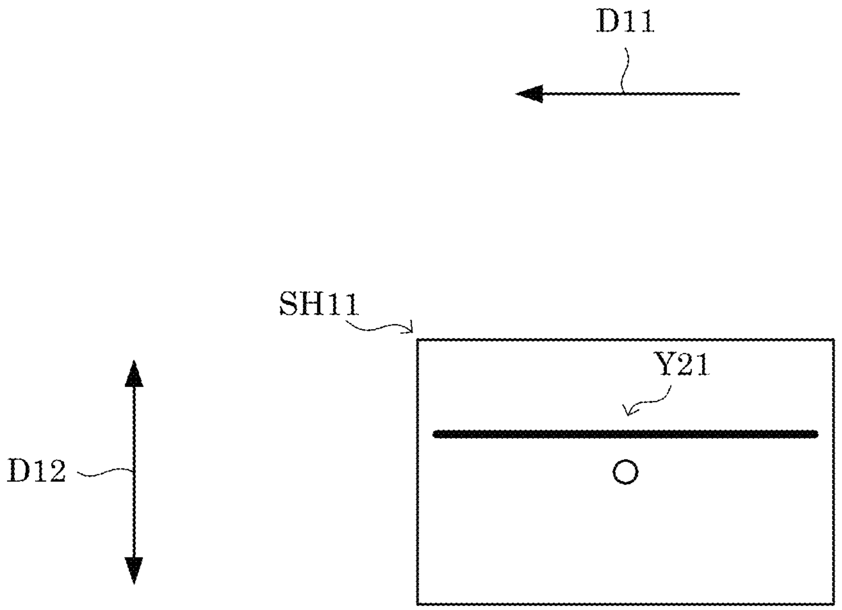
FIG. 8 is a diagram showing an example of an image formed on a sensing sheet by a formation processing portion of the image forming apparatus according to the embodiment of this disclosure.

FIG. 8 shows an example of the first image Y21 formed on the sensing sheet SH11 by the formation processing portion 65. The first image Y21 shown in FIG. 8 is an image formed on the sensing sheet SH11 on the basis of the first image data Y11 shown in FIG. 7. In a case where the position P1 (see FIG. 2) of the image forming portion 3 and the position P2 (see FIG. 2) of the line sensor 51 do not agree with each other, the first image Y21 is disposed at a position shifted in the width direction D12 from the middle portion of the sensing sheet SH11 as shown in FIG. 8. It is to be noted that FIG. 8 shows the middle portion of the sensing sheet SH11 by a white circle.

Here, in a case where the position P1 of the image forming portion 3 and the position P2 of the line sensor 51 agree with each other, the first image Y21 is disposed in the middle portion of the sensing sheet SH11 whether or not the sensing sheet SH11 has a positional misalignment in the width direction D12. That is, the amount of misalignment and the direction of misalignment of the line sensor 51 along the width direction D12 with respect to the image forming portion 3 are reflected in the amount of misalignment and the direction of misalignment of the first image Y21 along the width direction D12 with respect to the middle portion of the sensing sheet SH11 on the sensing sheet SH11 output through the formation process.

The second conveyance processing portion 66 executes a second conveyance process of conveying, along the sheet conveyance route R11, the sensing sheet SH11 (see FIG. 8) on which an image has been formed by the formation processing portion 65.

For example, in a case where the formation process is executed, the second conveyance processing portion 66 causes the operation display portion 6 to display a second guidance screen. The second guidance screen includes a message asking the user to place, on the sheet feed cassette 11, the sensing sheet SH11 discharged to the sheet discharge tray 12 and having an image formed thereon. In addition, the second guidance screen includes a second enter key to be used to perform an operation of executing the second conveyance process.

The second conveyance processing portion 66 then executes the second conveyance process in a case where an operation of the user on the second enter key is received. In the second conveyance process, the sheet conveying portion 2 and the conveying unit 4 are used to convey the sensing sheet SH11 placed on the sheet feed cassette 11 and having an image formed thereon along the sheet conveyance route R11.

The second acquisition processing portion 73 executes a second acquisition process of acquiring shape data X12 (see FIG. 9) by using the shape reading portion 5. The shape data X12 is the shape data X10 (see FIG. 9) indicating the shape of the sensing sheet SH11 (see FIG. 8) conveyed by the second conveyance processing portion 66.

For example, in a case where the front end of the sensing sheet SH11 is sensed by the sheet sensor, the second acquisition processing portion 73 causes the shape reading portion 5 to start to read the shape of the sensing sheet SH11. In addition, in a case where the specific time passes after the back end of the sensing sheet SH11 is sensed by the sheet sensor, the second acquisition processing portion 73 causes the shape reading portion 5 to end reading the shape of the sensing sheet SH11. The second acquisition processing portion 73 then acquires each piece of the line data output from the AFE circuit 52 in a period in which the shape reading portion 5 is reading the shape of the sensing sheet SH11.

Figure 9:
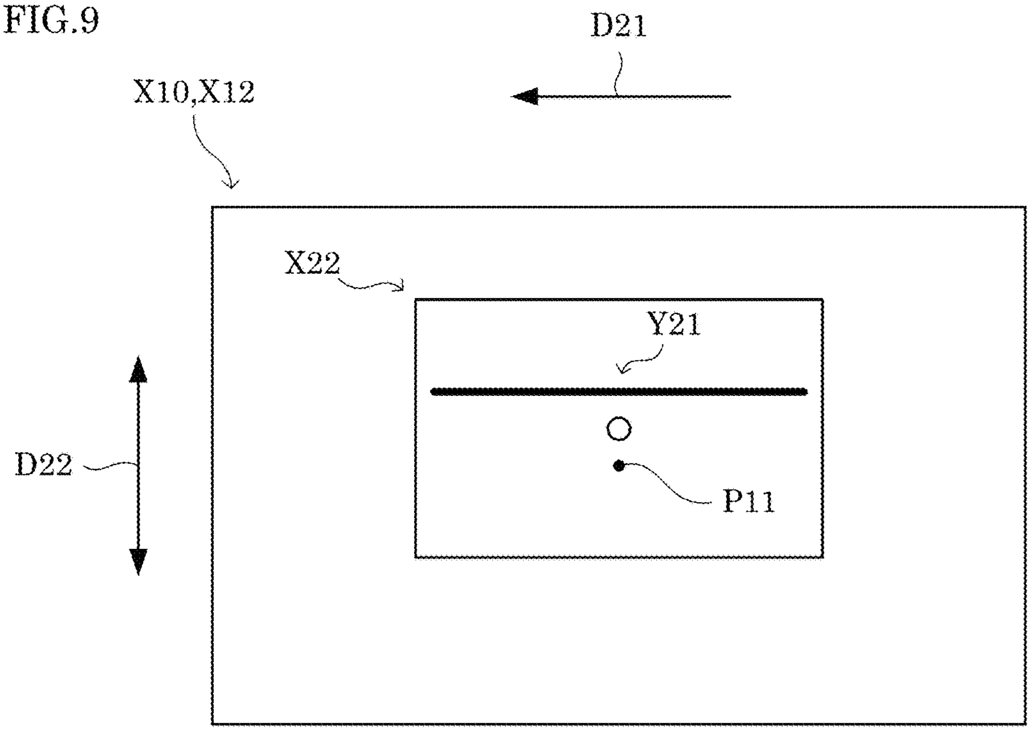
FIG. 9 is a diagram showing an example of shape data acquired by a second acquisition processing portion of the image forming apparatus according to the embodiment of this disclosure.

FIG. 9 shows an example of the shape data X12. The shape data X12 shown in FIG. 9 is data acquired by the second acquisition processing portion 73 in a case where the position P1 (see FIG. 2) of the image forming portion 3 and the position P2 (see FIG. 2) of the line sensor 51 do not agree with each other and the sensing sheet SH11 has no positional misalignment in the width direction D12. The shape data X12 includes a sheet region X22 indicating the sensing sheet SH11. The sheet region X22 includes the first image Y21.

In a case where the position P1 (see FIG. 2) of the image forming portion 3 and the position P2 (see FIG. 2) of the line sensor 51 do not agree with each other, the sheet region X22 is disposed at a position shifted in the second direction D22 from the first reference position P11 (see FIG. 9) in the shape data X10 as shown in FIG. 9. It is to be noted that FIG. 9 shows the middle portion of the sheet region X22 by a white circle.

The second adjustment processing portion 74 executes a second adjustment process of adjusting the position of a second image Y22 in second image data Y12 (see FIG. 10) in the second direction D22 on the basis of the positional relationship in the second direction D22 between the sheet region X22 (see FIG. 9) in the shape data X12 acquired by the second acquisition processing portion 73 and the first reference position P11 (see FIG. 9). The second image Y22 has a larger size in the second direction D22 than the size of the first image Y21. The second image data Y12 includes the second image Y22.

Specifically, the second adjustment processing portion 74 acquires the amount of misalignment and the direction of misalignment of the sheet region X22 along the second direction D22 with respect to the first reference position P11 on the basis of coordinate information about the middle portion of the sheet region X22 in the shape data X12 acquired by the second acquisition processing portion 73 and coordinate information about the first reference position P11. The second adjustment processing portion 74 then moves the second image Y22 in the acquired direction of misalignment by the acquired amount of misalignment.

Figure 10:
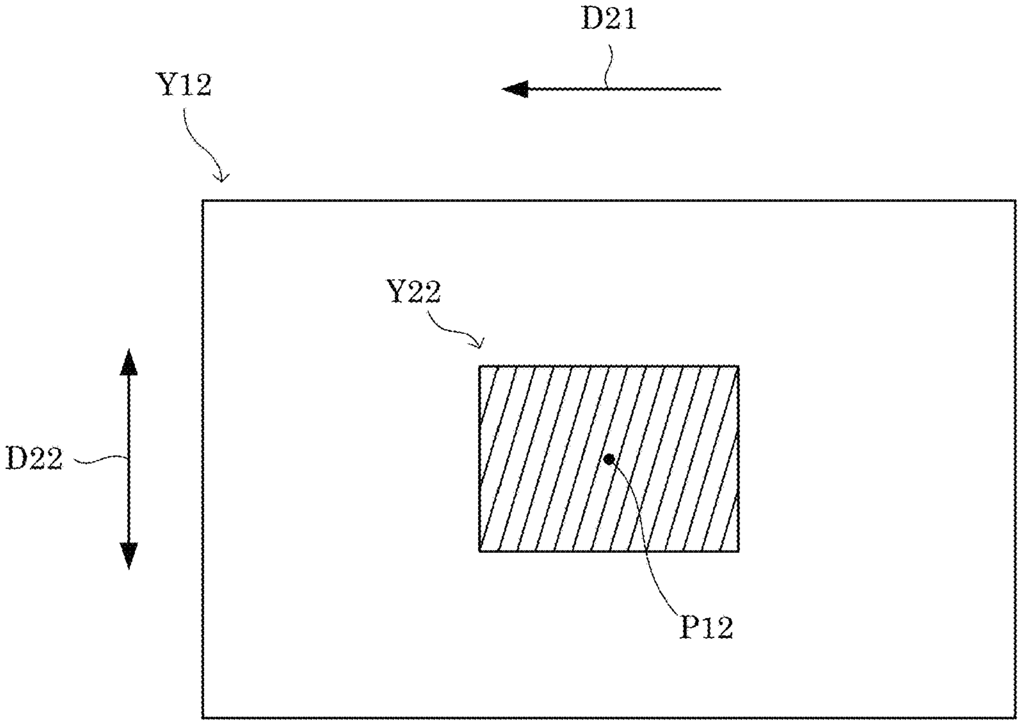
FIG. 10 is a diagram showing an example of second image data that has not yet been adjusted by a second adjustment processing portion of the image forming apparatus according to the embodiment of this disclosure.

FIG. 10 shows an example of the second image data Y12 that has not yet been adjusted by the second adjustment processing portion 74. For example, the second image Y22 is a striped or rectangular image that is long in the first direction D21 as shown in FIG. 10. For example, the second image Y22 is an image colored in black. The second image Y22 is disposed in the middle of the second image data Y12 in the second direction D22. The outside of the second image Y22 in the second image data Y12 is a colorless region. That is, the outside of the second image Y22 in the second image data Y12 is formed by using a white pixel.

Figure 11:
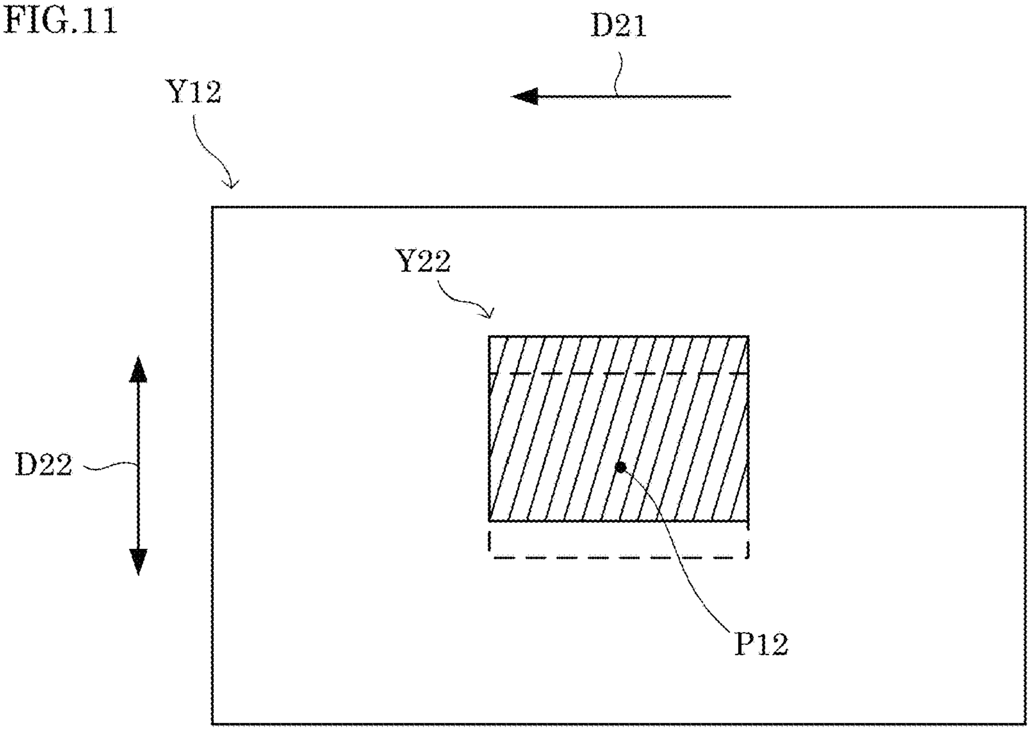
FIG. 11 is a diagram showing an example of the second image data adjusted by the second adjustment processing portion of the image forming apparatus according to the embodiment of this disclosure.

In addition, FIG. 11 shows an example of the second image data Y12 adjusted by the second adjustment processing portion 74. It is to be noted that FIGS. 10 and 11 each hatch the second image Y22. In addition, FIG. 11 shows the second image Y22 that has not yet been adjusted (moved) by the second adjustment processing portion 74 by a dashed line.

The mask processing portion 75 executes a mask process of masking the outside of a region of the second image data Y12 (see FIG. 11) overlapping with the sheet region X22 of the shape data X12 in a case where the shape data X12 is overlaid on the second image data Y12 such that the second reference position P12 (see FIG. 11) defined in advance in the second image data Y12 and the first reference position P11 (see FIG. 9) in the shape data X12 (see FIG. 9) agree with each other. The second image data Y12 is adjusted by the second adjustment processing portion 74. The shape data X12 is acquired by the second acquisition processing portion 73. The second reference position P12 is a position corresponding to the position P1 of the image forming portion 3. Specifically, the second reference position P12 is the position of the middle of the second image data Y12 in the first direction D21 and the position of the middle of the second image data Y12 in the second direction D22.

For example, the mask processing portion 75 substitutes a pixel to be masked in the second image Y22 with a white pixel.

For example, the mask processing portion 75 records the position (coordinate information) of a masked masking target pixel in the second image Y22.

Figure 12:
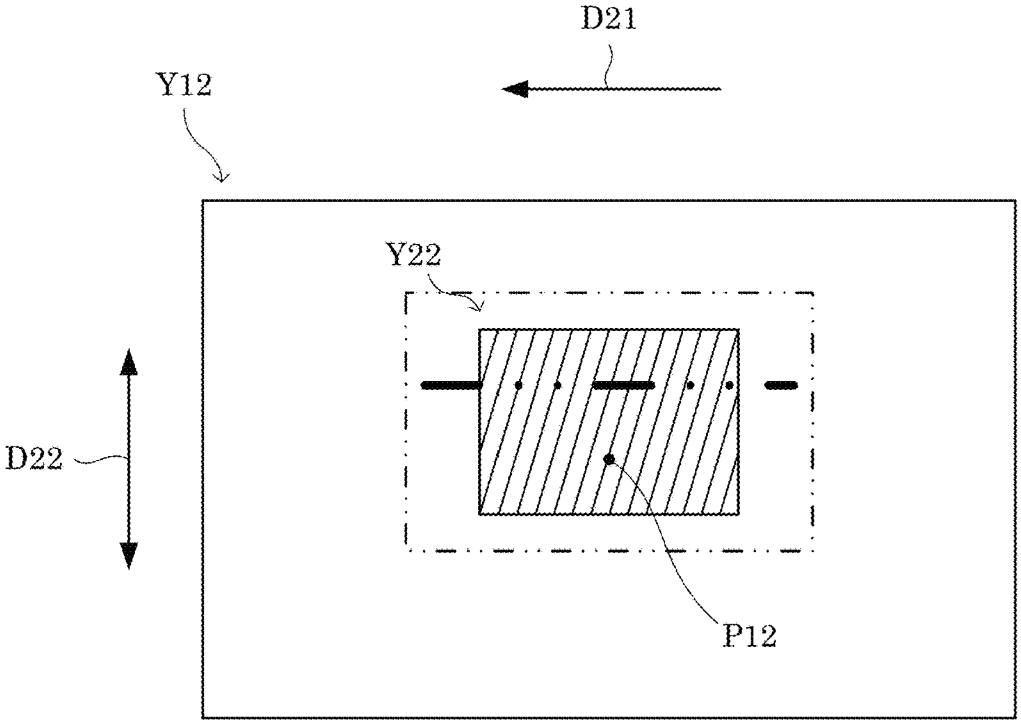
FIG. 12 is a diagram showing an example of the second image data adjusted by the second adjustment processing portion of the image forming apparatus according to the embodiment of this disclosure.

FIG. 12 shows an example of the second image data Y12 adjusted by the second adjustment processing portion 74. It is to be noted that FIG. 12 shows the sheet region X22 of the shape data X12 overlaid on the second image data Y12 and the first image Y21 by two-dot chain lines.

Figure 13:
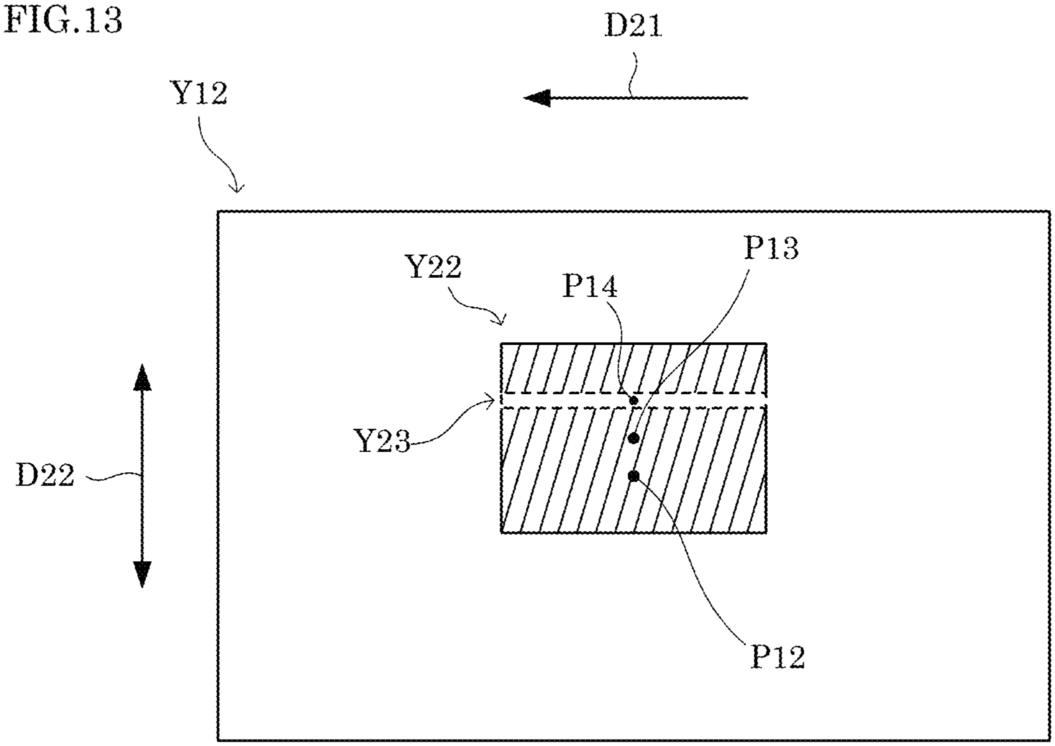
FIG. 13 is a diagram showing an example of the second image data masked by a mask processing portion of the image forming apparatus according to the embodiment of this disclosure.

In addition, FIG. 13 shows an example of the second image data Y12 masked by the mask processing portion 75. It is to be noted that FIG. 13 shows a mask region Y23 of the second image Y22 masked by the mask processing portion 75 by a dashed line.

The positional relationship (see FIG. 8) between the first image Y21 on the sensing sheet SH11 output through the formation process and the middle portion of the sensing sheet SH11 is reflected through the mask process in the second image data Y12 subjected to the mask process.

The sensing processing portion 76 executes a sensing process of sensing the amount of misalignment of the line sensor 51 in the width direction D12 with respect to the image forming portion 3 on the basis of the positional relationship in the second direction D22 between the second image Y22 (see FIG. 13) in the second image data Y12 subjected to the mask process and the mask region Y23 (see FIG. 13) included in the second image Y22 masked by the mask processing portion 75.

For example, the sensing processing portion 76 acquires a middle position P13 (see FIG. 13) of the second image Y22 in the second image data Y12 subjected to the mask process on the basis of coordinate information about the second reference position P12 in the second image data Y12, and the amount of movement and the direction of movement of the second image Y22 by the second adjustment processing portion 74.

In addition, the sensing processing portion 76 acquires a middle position P14 (see FIG. 13) of the mask region Y23 in the second image data Y12 subjected to the mask process on the basis of a result of the recording of the position of the masking target pixel by the mask processing portion 75. For example, the sensing processing portion 76 acquires coordinate information about the middle position P14 on the basis of coordinate information about each of paired corners across the middle position P14 of the mask region Y23 having a quadrangular shape.

The sensing processing portion 76 then acquires the amount of misalignment of the acquired middle position P14 of the mask region Y23 along the second direction D22 with respect to the acquired middle position P13 of the second image Y22 as the amount of misalignment of the line sensor 51 in the width direction D12 with respect to the image forming portion 3. In addition, the sensing processing portion 76 acquires the direction opposite to the direction of misalignment of the acquired middle position P14 of the mask region Y23 with respect to the acquired middle position P13 of the second image Y22 as the direction of misalignment of the line sensor 51 with respect to the image forming portion 3.

The setting processing portion 77 sets the first reference position P11 (see FIG. 5) on the basis of a result of sensing by the sensing processing portion 76.

Specifically, the setting processing portion 77 moves the first reference position P11 in the direction of misalignment of the mask region Y23 acquired by the sensing processing portion 76 with respect to the second image Y22 by the amount of misalignment of the mask region Y23 acquired by the sensing processing portion 76 with respect to the second image Y22.

[Reference Position Setting Process]

Figure 4:
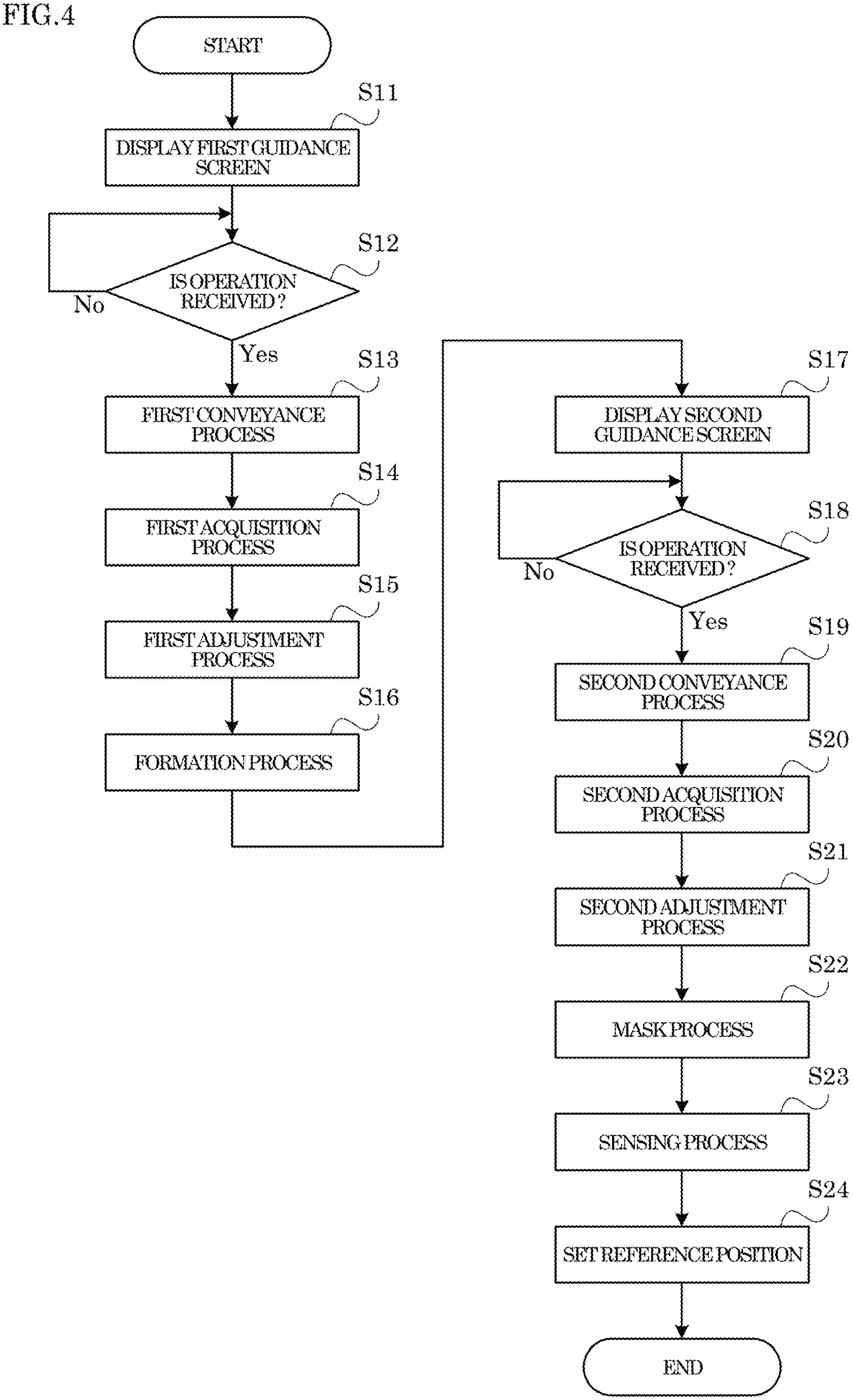
FIG. 4 is a flowchart showing an example of a reference position setting process that is executed by the image forming apparatus according to the embodiment of this disclosure.

The following describes a sensing method according to this disclosure along with examples of procedures of a reference position setting process that is executed by the control portion 7 and the image processing portion 8 in the image forming apparatus 100 with reference to FIG. 4. Here, steps S11, S12, . . . denote the numbers of processing procedures (steps) that are executed by the control portion 7 or the image processing portion 8. It is to be noted that the reference position setting process is executed in a case where the operation display portion 6 receives an operation of a user to instruct the reference position setting process to be executed.

<Step S11>

First, in step S11, the control portion 7 causes the operation display portion 6 to display the first guidance screen. The process of step S11 is executed by the first conveyance processing portion 64 of the control portion 7.

<Step S12>

In step S12, the control portion 7 determines whether or not an operation of a user on the first enter key included in the first guidance screen is received.

Here, when the control portion 7 determines that an operation of a user on the first enter key is received (Yes in S12), the control portion 7 causes the process to transition to step S13. In addition, if an operation of a user on the first enter key is not received (No in S12), the control portion 7 waits for an operation of a user on the first enter key in step S12.

<Step S13>

In step S13, the control portion 7 executes the first conveyance process of conveying the sensing sheet SH11 (see FIG. 8) along the sheet conveyance route R11. The process of step S13 is an example of a first conveyance step according to this disclosure and is executed by the first conveyance processing portion 64 of the control portion 7.

<Step S14>

In step S14, the image processing portion 8 executes the first acquisition process of acquiring the shape data X11 (see FIG. 5) by using the shape reading portion 5. The process of step S14 is an example of a first acquisition step according to this disclosure and is executed by the first acquisition processing portion 71 of the image processing portion 8.

<Step S15>

In step S15, the image processing portion 8 executes the first adjustment process of adjusting the position of the first image Y21 in the first image data Y11 (see FIG. 6) in the second direction D22 on the basis of the positional relationship in the second direction D22 between the sheet region X21 (see FIG. 5) in the shape data X11 acquired in the process of step S14 and the first reference position P11 (see FIG. 5) in the shape data X10. The process of step S15 is an example of a first adjustment step according to this disclosure and is executed by the first adjustment processing portion 72 of the image processing portion 8.

<Step S16>

In step S16, the control portion 7 executes the formation process of forming, on the sensing sheet SH11, an image based on the first image data Y11 (see FIG. 7) adjusted in the process of step S15 by using the image forming portion 3. The process of step S16 is an example of a formation step according to this disclosure and is executed by the formation processing portion 65 of the control portion 7.

<Step S17>

In step S17, the control portion 7 causes the operation display portion 6 to display the second guidance screen. The process of step S17 is executed by the second conveyance processing portion 66 of the control portion 7.

<Step S18>

In step S18, the control portion 7 determines whether or not an operation of a user on the second enter key included in the second guidance screen is received.

Here, when the control portion 7 determines that an operation of a user on the second enter key is received (Yes in S18), the control portion 7 causes the process to transition to step S19. In addition, if an operation of a user on the second enter key is not received (No in S18), the control portion 7 waits for an operation of a user on the second enter key in step S18.

<Step S19>

In step S19, the control portion 7 executes the second conveyance process of conveying, along the sheet conveyance route R11, the sensing sheet SH11 (see FIG. 8) on which an image has been formed through the process of step S16. The process of step S19 is an example of a second conveyance step according to this disclosure and is executed by the second conveyance processing portion 66 of the control portion 7.

<Step S20>

In step S20, the image processing portion 8 executes the second acquisition process of acquiring the shape data X12 (see FIG. 9) by using the shape reading portion 5. The process of step S20 is an example of a second acquisition step according to this disclosure and is executed by the second acquisition processing portion 73 of the image processing portion 8.

<Step S21>

In step S21, the image processing portion 8 executes the second adjustment process of adjusting the position of the second image Y22 in the second image data Y12 (see FIG. 10) in the second direction D22 on the basis of the positional relationship in the second direction D22 between the sheet region X22 (see FIG. 9) in the shape data X12 acquired in the process of step S20 and the first reference position P11 (see FIG. 9). The process of step S21 is an example of a second adjustment step according to this disclosure and is executed by the second adjustment processing portion 74 of the image processing portion 8.

<Step S22>

In step S22, the image processing portion 8 executes the mask process of masking the outside of a region of the second image data Y12 (see FIG. 11) overlapping with the sheet region X22 of the shape data X12 in a case where the shape data X12 is overlaid on the second image data Y12 such that the second reference position P12 (see FIG. 11) in the second image data Y12 and the first reference position P11 (see FIG. 9) in the shape data X12 (see FIG. 9) agree with each other. The second image data Y12 is adjusted in the process of step S21. The shape data X12 is acquired in the process of step S20. The process of step S22 is an example of a mask step according to this disclosure and is executed by the mask processing portion 75 of the image processing portion 8.

<Step S23>

In step S23, the image processing portion 8 executes the sensing process of sensing the amount of misalignment of the line sensor 51 in the width direction D12 with respect to the image forming portion 3 on the basis of the positional relationship in the second direction D22 between the second image Y22 (see FIG. 13) in the second image data Y12 subjected to the mask process and the mask region Y23 (see FIG. 13) included in the second image Y22. The process of step S23 is an example of a sensing step according to this disclosure and is executed by the sensing processing portion 76 of the image processing portion 8.

<Step S24>

In step S24, the image processing portion 8 sets the first reference position P11 (see FIG. 5) on the basis of a result of sensing in the process of step S23. The process of step S24 is executed by the setting processing portion 77 of the image processing portion 8.

In this way, the image forming apparatus 100 is capable of sensing the amount of misalignment between the position P1 of the image forming portion 3 and the position P2 of the line sensor 51.

It is to be noted that the first reference position P11 does not have to be the position of the middle of the shape data X10 in the first direction D21. In this case, the second reference position P12 does not also have to be the position of the middle of the second image data Y12 in the first direction D21.

SUPPLEMENTARY NOTES OF INVENTION

The gist of the invention extracted from the embodiment described above will be supplementarily noted below. It is to be noted that the respective configurations and the respective processing functions described in the following supplementary notes can be sorted out and used in any combination.

Supplementary Note 1

An image forming apparatus including:

an image forming portion configured to form an image on a sheet conveyed along a conveyance route defined in advance;

an output portion including an imaging portion on an upstream side of the image forming portion in the conveyance route in a conveyance direction of the sheet, the imaging portion being provided to be long along a width direction orthogonal to the conveyance direction, the output portion being configured to output shape data indicating a shape of the sheet imaged by the imaging portion;

a first conveyance processing portion configured to convey a sensing sheet along the conveyance route;

a first acquisition processing portion configured to acquire the shape data by using the output portion, the shape data indicating the shape of the sensing sheet conveyed by the first conveyance processing portion;

a first adjustment processing portion configured to adjust a position of a first image defined in advance in first image data in a specific direction corresponding to the width direction on the basis of a positional relationship in the specific direction between a sheet region in the shape data acquired by the first acquisition processing portion and a first reference position defined in advance in the shape data, the first image data including the first image;

a formation processing portion configured to form an image on the sensing sheet by using the image forming portion, the image being based on the first image data adjusted by the first adjustment processing portion;

a second conveyance processing portion configured to convey, along the conveyance route, the sensing sheet on which an image has been formed by the formation processing portion;

a second acquisition processing portion configured to acquire the shape data by using the output portion, the shape data indicating a shape of the sensing sheet conveyed by the second conveyance processing portion;

a second adjustment processing portion configured to adjust a position of a second image in second image data in the specific direction on the basis of a positional relationship in the specific direction between a sheet region in the shape data acquired by the second acquisition processing portion and the first reference position, the second image having a larger size in the specific direction than a size of the first image, the second image data including the second image;

a mask processing portion configured to mask outside of a region of the second image data overlapping with the sheet region of the shape data in a case where the shape data is overlaid on the second image data such that a second reference position defined in advance in the second image data and the first reference position in the shape data agree with each other, the second image data being adjusted by the second adjustment processing portion, the shape data being acquired by the second acquisition processing portion; and a sensing processing portion configured to sense an amount of misalignment of the imaging portion in the width direction with respect to the image forming portion on the basis of a positional relationship in the specific direction between the second image in the second image data and a mask region masked by the mask processing portion, the mask region being included in the second image.

Supplementary Note 2

The image forming apparatus according to Supplementary Note 1, including a setting processing portion configured to set the first reference position on the basis of a result of sensing by the sensing processing portion.

Supplementary Note 3

The image forming apparatus according to Supplementary Note 1 or 2, in which the mask processing portion records a position of a masked masking target pixel in the second image, and the sensing processing portion acquires a position of the mask region in the second image data on the basis of a result of recording of the position of the masking target pixel.

Supplementary Note 4

A sensing method that is executed by an image forming apparatus including an image forming portion configured to form an image on a sheet conveyed along a conveyance route defined in advance and an output portion including an imaging portion on an upstream side of the image forming portion in the conveyance route in a conveyance direction of the sheet, the imaging portion being provided to be long along a width direction orthogonal to the conveyance direction, the output portion being configured to output shape data indicating a shape of the sheet imaged by the imaging portion, the sensing method including:

a first conveyance step of conveying a sensing sheet along the conveyance route;

a first acquisition step of acquiring the shape data by using the output portion, the shape data indicating the shape of the sensing sheet conveyed in the first conveyance step;

a first adjustment step of adjusting a position of a first image defined in advance in first image data in a specific direction corresponding to the width direction on the basis of a positional relationship in the specific direction between a sheet region in the shape data acquired in the first acquisition step and a first reference position defined in advance in the shape data, the first image data including the first image;

a formation step of forming an image on the sensing sheet by using the image forming portion, the image being based on the first image data adjusted in the first adjustment step;

a second conveyance step of conveying, along the conveyance route, the sensing sheet on which an image has been formed in the formation step;

a second acquisition step of acquiring the shape data by using the output portion, the shape data indicating a shape of the sensing sheet conveyed in the second conveyance step;

a second adjustment step of adjusting a position of a second image in second image data in the specific direction on the basis of a positional relationship in the specific direction between a sheet region in the shape data acquired in the second acquisition step and the first reference position, the second image having a larger size in the specific direction than a size of the first image, the second image data including the second image;

a mask step of masking outside of a region of the second image data overlapping with the sheet region of the shape data in a case where the shape data is overlaid on the second image data such that a second reference position defined in advance in the second image data and the first reference position in the shape data agree with each other, the second image data being adjusted in the second adjustment step, the shape data being acquired in the second acquisition step; and a sensing step of sensing an amount of misalignment of the imaging portion in the width direction with respect to the image forming portion on the basis of a positional relationship in the specific direction between the second image in the second image data and a mask region masked in the mask step, the mask region being included in the second image.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:

an image forming portion configured to form an image on a sheet conveyed along a conveyance route defined in advance;

an output portion including an imaging portion on an upstream side of the image forming portion in the conveyance route in a conveyance direction of the sheet, the imaging portion being provided to be long along a width direction orthogonal to the conveyance direction, the output portion being configured to output shape data indicating a shape of the sheet imaged by the imaging portion;

a first conveyance processing portion configured to convey a sensing sheet along the conveyance route;

a first acquisition processing portion configured to acquire the shape data by using the output portion, the shape data indicating the shape of the sensing sheet conveyed by the first conveyance processing portion;

a first adjustment processing portion configured to adjust a position of a first image defined in advance in first image data in a specific direction corresponding to the width direction on a basis of a positional relationship in the specific direction between a sheet region in the shape data acquired by the first acquisition processing portion and a first reference position defined in advance in the shape data, the first image data including the first image;

a formation processing portion configured to form an image on the sensing sheet by using the image forming portion, the image being based on the first image data adjusted by the first adjustment processing portion;

a second conveyance processing portion configured to convey, along the conveyance route, the sensing sheet on which an image has been formed by the formation processing portion;

a second acquisition processing portion configured to acquire the shape data by using the output portion, the shape data indicating a shape of the sensing sheet conveyed by the second conveyance processing portion;

a second adjustment processing portion configured to adjust a position of a second image in second image data in the specific direction on a basis of a positional relationship in the specific direction between a sheet region in the shape data acquired by the second acquisition processing portion and the first reference position, the second image having a larger size in the specific direction than a size of the first image, the second image data including the second image;

a mask processing portion configured to mask outside of a region of the second image data overlapping with the sheet region of the shape data in a case where the shape data is overlaid on the second image data such that a second reference position defined in advance in the second image data and the first reference position in the shape data agree with each other, the second image data being adjusted by the second adjustment processing portion, the shape data being acquired by the second acquisition processing portion; and a sensing processing portion configured to sense an amount of misalignment of the imaging portion in the width direction with respect to the image forming portion on a basis of a positional relationship in the specific direction between the second image in the second image data and a mask region masked by the mask processing portion, the mask region being included in the second image.

2. The image forming apparatus according to claim 1, comprising a setting processing portion configured to set the first reference position on a basis of a result of sensing by the sensing processing portion.

3. The image forming apparatus according to claim 1, wherein the mask processing portion records a position of a masked masking target pixel in the second image, and the sensing processing portion acquires a position of the mask region in the second image data on a basis of a result of recording of the position of the masking target pixel.

4. A sensing method that is executed by an image forming apparatus including an image forming portion configured to form an image on a sheet conveyed along a conveyance route defined in advance and an output portion including an imaging portion on an upstream side of the image forming portion in the conveyance route in a conveyance direction of the sheet, the imaging portion being provided to be long along a width direction orthogonal to the conveyance direction, the output portion being configured to output shape data indicating a shape of the sheet imaged by the imaging portion, the sensing method comprising:

a first conveyance step of conveying a sensing sheet along the conveyance route;

a first acquisition step of acquiring the shape data by using the output portion, the shape data indicating the shape of the sensing sheet conveyed in the first conveyance step;

a first adjustment step of adjusting a position of a first image defined in advance in first image data in a specific direction corresponding to the width direction on a basis of a positional relationship in the specific direction between a sheet region in the shape data acquired in the first acquisition step and a first reference position defined in advance in the shape data, the first image data including the first image;

a formation step of forming an image on the sensing sheet by using the image forming portion, the image being based on the first image data adjusted in the first adjustment step;

a second conveyance step of conveying, along the conveyance route, the sensing sheet on which an image has been formed in the formation step;

a second acquisition step of acquiring the shape data by using the output portion, the shape data indicating a shape of the sensing sheet conveyed in the second conveyance step;

a second adjustment step of adjusting a position of a second image in second image data in the specific direction on a basis of a positional relationship in the specific direction between a sheet region in the shape data acquired in the second acquisition step and the first reference position, the second image having a larger size in the specific direction than a size of the first image, the second image data including the second image;

a mask step of masking outside of a region of the second image data overlapping with the sheet region of the shape data in a case where the shape data is overlaid on the second image data such that a second reference position defined in advance in the second image data and the first reference position in the shape data agree with each other, the second image data being adjusted in the second adjustment step, the shape data being acquired in the second acquisition step; and a sensing step of sensing an amount of misalignment of the imaging portion in the width direction with respect to the image forming portion on a basis of a positional relationship in the specific direction between the second image in the second image data and a mask region masked in the mask step, the mask region being included in the second image.

* * * * *